July 16, 1940.  J. O. E. JOHANSSON  2,208,371
COMBINATION BLOCK GAUGE SET
Filed May 18, 1937

Inventor:
John Olof Edvard Johansson
by George Bayard Jones,
Attorney.

Patented July 16, 1940

2,208,371

UNITED STATES PATENT OFFICE 2,208,371

COMBINATION BLOCK GAUGE SET

John Olof Edvard Johansson, Eskilstuna, Sweden, assignor to Ford Motor Company, Dearborn, Mich., a corporation of Delaware Application May 18, 1937, Serial No. 143,272
In Sweden May 20, 1936

3 Claims. (Cl. 33—168)

The present invention relates to an improvement in combination block gauge sets of the kind which consist of a plurality of gauge blocks which may be combined to form different measures or dimensions, and which are made of hardened steel, or optionally, of a stainless steel alloy, as proposed, for instance, in the Swedish patent specification No. 71,095 and the British specification No. 356,026. As is well known, such combination block gauge sets are used, for the most part, for checking or gauging measuring tools, such as snap gauges, used in machine shops. This use of the blocks entails that the blocks will gradually become worn to some extent, so that after they have been in regular use for some time, they can no longer be relied upon to hold the exact units of measure marked on the same.

The object of the present invention is to eliminate or substantially minimize this inconvenience and waste. The invention consists principally in the combination block gauge set comprising, in addition to the ordinary blocks above mentioned, at least two additional blocks which are made of a material which is considerably harder or more resistant to wear than that of the ordinary blocks. These additional blocks, which thus have a resistance to wear which is many times higher than that of the ordinary steel blocks, are intended to be placed one at each end of the composite block or combination when built up of one or more ordinary blocks to form the measure or dimension desired, so that said additional blocks will thus take up the wear which is caused during use of the combination, for instance, for checking a snap gauge.

In this way the life of the combination gauge set is considerably lengthened, and the accuracy of the same is improved. The said additional wear blocks may be made of any suitable well-known hard metal, such as Widia metal, Stellite metal, or the like, or optionally, they may be made of chromium, or the measuring surfaces on the same may be plated with a layer of chromium which may form a hard wear surface.

Figure 1:
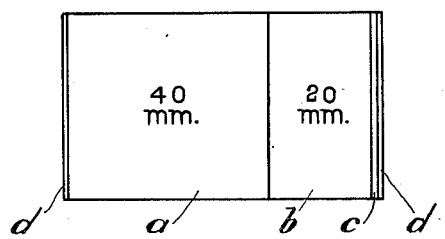
Figure 2:
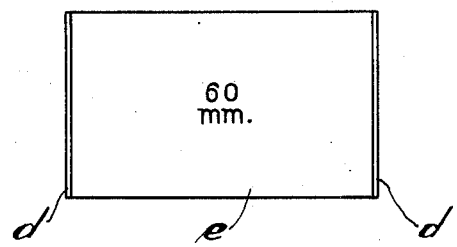

The accompanying drawing illustrates by way of example two composite gauges having wear blocks according to the invention. Fig. 1 shows a composite gauge made up of three ordinary blocks and two wear blocks, and Fig. 2 shows a composite gauge made up of one ordinary block and two wear blocks.

The composite gauge illustrated in Fig. 1 is made up of three ordinary blocks $a$, $b$ and $c$ having the dimensions 40 mm., 20 mm. and 1.05 mm., respectively, and two wear blocks $d$, which are placed one at each end of the combination. In the instance illustrated, each of these wear blocks has a dimension of 1 mm., so that the over-all dimension of the entire combination shown in Fig. 1 is 63.05 mm. The combination shown in Fig. 2 is made up of a single ordinary block $e$ having a dimension of 60 mm., and two wear blocks $d$, placed one at each end of the block $e$, and each of which has a dimension of 1 mm., so that the over-all dimension of the combination shown in Fig. 2 is 62.00 mm.

When these combinations are used, for instance, for checking snap gauges or similar measuring tools, the wear blocks $d$ will be subjected to the unavoidable wear, and since said wear blocks are many times more resistant to wear than the ordinary steel blocks, it will be understood that the use of the same results in the life of the combination block gauge set being considerably lengthened. In addition, more than two wear blocks may be furnished with each combination block gauge set, if desired, for instance two or more pairs of such wear blocks, which may be used alternately or in their proper turns.

The additional wear blocks $d$ may suitably have the same dimensions of the measuring surfaces as the ordinary blocks, so that they may be conveniently combined with the latter. On the other hand, the wear blocks should have a small thickness, so that each wear block represents a certain unit of measure, for instance 1 to 2 mm., which is small in relation to that of the ordinary blocks. This construction insures that the variations in the change of the over-all dimension of a combination made up of one or more ordinary blocks and two wear blocks, which, upon a change in temperature, are caused by the material of the wear blocks being different than the material of ordinary blocks, shall be as small as possible.

While the wear blocks should, of course, be made in such manner that they hold correct dimensions at the same temperature, for instance, 20° C., as that at which the ordinary blocks hold correct dimensions, still, in view of the fact that the wear blocks are made of a material the heat expansion coefficient of which differs considerably from that of hardened steel, the nominal dimensions of the wear blocks are changed, upon a change of temperature, at a different rate from that of the nominal dimensions of the ordinary blocks, and therefore, in order that the error thus ensuing shall be as little as possible, it follows that the wear blocks shall represent a small unit of measure. Preferably, this unit of measure shall be the same for all of the wear blocks of a combination block gauge set. The wear blocks may suitably be provided with a mark, such as a colour mark, which clearly distinguishes the same from the ordinary blocks, with a view to avoid confusion during use of the set.

The combinations above described and illustrated in the drawing are, of course, only to be regarded as examples, and it will be understood that the invention is in no way restricted to these particular combinations.

I claim:

1. A combination block gauge set, comprising a plurality of blocks of hardened steel having varying dimensions such that the blocks may be assembled to form combinations having different over-all dimensions, and at least two additional blocks made of material at least twice as resistant to wear as the first-mentioned blocks and used for the two ends of any assembled combination of the first-mentioned blocks.

2. A combination block gauge set as claimed in claim 1, in which each of said end blocks represents a unit of measure which is small in relation to the over-all dimension of the usual combination, so that the variations in the change of the over-all dimension of the combination which upon a change of temperature are caused by the end blocks being made of another material than the first-mentioned blocks shall be as small as possible.

3. A combination block gauge system comprising carbon steel blocks having opposed parallel faces accurately spaced at predetermined distances representing standard units of measure and including two wear plates to take up and prevent the wear of the blocks in the system, said wear plates being made of harder material, as described herein, resisting the wear of rough surfaces and ordinary lapping compound or abrasives used when finishing industrial gauges and the like, said wear plates each having a thickness which is represented by a simple decimal equivalent of a fraction of a standard unit of measure so as to make the combinations easy to figure.

JOHN OLOF EDVARD JOHANSSON.

CERTIFICATE OF CORRECTION.

Patent No. 2,208,371.                                                                                July 16, 1940.

JOHN OLOF EDVARD JOHANSSON.

It is hereby certified that error appears in the printed specification of the above numbered patent requiring correction as follows: Page 2, second column, line 10, claim 3, strike out the words "carbon steel"; and that the said Letters Patent should be read with this correction therein that the same may conform to the record of the case in the Patent Office.

Signed and sealed this 10th day of September, A. D. 1940.

(Seal)                                                                               Leslie Frazer,
Acting Commissioner of Patents.